United States Patent
Masuoka et al.

(10) Patent No.: US 11,075,953 B2
(45) Date of Patent: Jul. 27, 2021

(54) CYBER ATTACK INFORMATION PROCESSING APPARATUS AND METHOD

(71) Applicant: FUJITSU LIMITED, Kawasaki (JP)

(72) Inventors: Ryusuke Masuoka, Setagaya (JP); Toshitaka Satomi, Yamato (JP); Koji Yamada, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 16/112,985

(22) Filed: Aug. 27, 2018

(65) Prior Publication Data

US 2019/0068645 A1 Feb. 28, 2019

(30) Foreign Application Priority Data

Aug. 28, 2017 (JP) .............................. JP2017-163746

(51) Int. Cl.
*H04L 29/06* (2006.01)
*G06F 16/25* (2019.01)

(52) U.S. Cl.
CPC ............ *H04L 63/20* (2013.01); *G06F 16/258* (2019.01); *H04L 63/1416* (2013.01)

(58) Field of Classification Search
CPC . H04L 63/20; H04L 63/1416; H04L 63/1441; G06F 16/258
See application file for complete search history.

(56) References Cited

U.S. PATENT DOCUMENTS 10,686,828 B2* 6/2020 Chernin .............. H04L 63/1441
2009/0044248 A1* 2/2009 Nakamura .............. H04L 63/20
726/1

(Continued)

FOREIGN PATENT DOCUMENTS

JP 2015-142324 8/2015
JP 2016-119061 6/2016
(Continued)

OTHER PUBLICATIONS

Mutemwa Muyowa et al., "Developing a Cyber Threat Intelligence sharing platform for South African Organisations", 2017 Conference on Information Communication Technology and Society (ICTAS), IEEE, Mar. 8, 2017 (Mar. 8, 2017), pp. 1-6, XP033093971. Cited in EESR dated Jan. 17, 2019 for corresponding European Patent Application No. 18188882.7.

(Continued)

*Primary Examiner* — Kristine L Kincaid
*Assistant Examiner* — Alexander R Lapian
(74) *Attorney, Agent, or Firm* — Fujitsu Patent Center (57) ABSTRACT

A cyber attack information processing apparatus includes a memory and a processor configured to, when a first system obtains first information regarding a cyber attack from a first terminal, store the first information in a state that the first information is accessible to a second terminal that is capable of accessing the first system, convert the first information having a first data structure into second information having a second data structure usable by a second system wherein the second information is to be provided for the second system, when the second system obtains third information regarding another cyber attack, convert the third information having the second data structure into fourth information having the first data structure, and provide the second terminal with the fourth information.

15 Claims, 10 Drawing Sheets

(56) References Cited

U.S. PATENT DOCUMENTS

| | | | |
|---|---|---|---|
| 2016/0112443 A1 | 4/2016 | Grossman et al. | |
| 2016/0119365 A1* | 4/2016 | Barel | G06F 16/84 |
| | | | 726/12 |
| 2016/0182559 A1 | 6/2016 | Francy et al. | |
| 2016/0308890 A1 | 10/2016 | Weilbacher | |
| 2016/0366174 A1 | 12/2016 | Chernin et al. | |
| 2017/0195439 A1* | 7/2017 | Dixon | G06F 21/56 |
| 2018/0288077 A1* | 10/2018 | Siddiqui | G06F 21/56 |

FOREIGN PATENT DOCUMENTS

| | | |
|---|---|---|
| JP | 2017-516411 | 6/2017 |
| WO | 2016/137721 A1 | 9/2016 |
| WO | 2016/168452 A1 | 10/2016 |

OTHER PUBLICATIONS

EESR—Extended European Search Report dated Jan. 17, 2019, from corresponding to European Patent Application No. 18188882.7.

EPOA—Office Action of European Patent Application No. 18188882.7 dated Aug. 26, 2019.

EPOA—Office Action of European Patent Application No. 18188882.7 dated Mar. 20, 2020. ** References cited in the EPOA were previously submitted in the IDS filed on Feb. 1, 2019.

JPOA—Office Action of Japanese Patent Application No. 2017-163746 dated Apr. 6, 2021 with Machine Translation.

* cited by examiner

```
...
<!-- cyber attack campaign -->
<stix:Campaigns>
<stix:Campaign xsi:type="campaign:CampaignType" id="IPA:campaign_example">
<campaign:Title>title of cyber attack campaign</campaign:Title>
<campaign:Description>description of cyber attack campaign</campaign:Description>
<campaign:Short_Description>summary of cyber attack campaign</campaign:Short_Description>
<campaign:Names>
<campaign:Name>name of cyber attack campaign</campaign:Name>
</campaign:Names>
<!-- intention of attack campaign -->
<campaign:Intended_Effect>
<stixCommon:Value xsi:type="stixVocabs:IntendedEffectVocab-1.0">Unauthorized Access</stixCommon:Value>
</campaign:Intended_Effect>
<!-- status of attack campaign -->
<campaign:Status xsi:type="stixVocabs:CampaignStatusVocab-1.0">Historic</campaign:Status>
<!-- TTPs of attack campaign -->
<campaign:Related_TTPs>
<campaign:Related_TTP>
<stixCommon:TTP idref="IPA:ttp_example"/>
</campaign:Related_TTP>
</campaign:Related_TTPs>
<!-- incident related to attack campaign -->
<campaign:Related_Incidents>
<campaign:Related_Incident>
<stixCommon:Incident idref="IPA:incident_example"/>
</campaign:Related_Incident>
</campaign:Related_Incidents>
...
```

CYBER ATTACK INFORMATION PROCESSING APPARATUS AND METHOD

CROSS-REFERENCE TO RELATED APPLICATION

This application is based upon and claims the benefit of priority of the prior Japanese Patent Application No. 2017-163746, filed on Aug. 28, 2017, the entire contents of which are incorporated herein by reference.

FIELD

The embodiments discussed herein are related to a cyber attack information processing technology.

BACKGROUND

Cyber attacks including an unauthorized access via a network are serious concerns today. Cyber attacks are made in a variety of methods. To counter the cyber attacks, finding and referencing cyber threat intelligence (CTI) related to similar cyber attacks prove effective.

The cyber threat intelligence is not only related to an alert automatically issued by a sensor related to a threat actor, a purpose of a cyber attack, and TTPs, but also information concerning the cyber attack organized in the form of analysis results and report by an analyst. The standardization of the cyber threat intelligence and the formation of the platform the cyber threat intelligence are currently in progress, and the infrastructure of using a large amount of cyber threat intelligence is being constructed. Also currently available is the cyber security system that generates a threat information message by processing events of data concerning network flow, packets, and users.

Japanese National Publication of International Patent Application No. 2017-516411 and Japanese Laid-open Patent Publication No. 2016-119061 discloses related art.

SUMMARY

According to an aspect of the invention, a cyber attack information processing apparatus includes a memory and a processor configured to, when a first system obtains first information regarding a cyber attack from a first terminal, store the first information in a state that the first information is accessible to a second terminal that is capable of accessing the first system, convert the first information having a first data structure into second information having a second data structure usable by a second system wherein the second information is to be provided for the second system, when the second system obtains third information regarding another cyber attack, convert the third information having the second data structure into fourth information having the first data structure, and provide the second terminal with the fourth information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The cyber threat intelligence is a standardized platform, which is applicable in a system-based system. In conventional technology, the system-based system is not shared with human-based systems, such as social networking system (SNS). For this reason, users of human-based systems have a smaller opportunity of using the cyber threat intelligence, and have difficulty in countering cyber attacks. Posting related to the cyber attack in the human-based systems is shared among users of the human-based systems but is not shared among the system-based systems.

Referring to the drawings, a cyber attack information processing program, a cyber attack information processing method, and an information processing apparatus of an embodiment are described below. In the discussion of the embodiment, elements identical in functionality are designated with the same reference numerals and the discussion, once made, is not repeated. The cyber attack information processing program, the cyber attack information processing method, and the information processing apparatus of the embodiment are described for exemplary purposes only, and the disclosure is not limited to the embodiment. The embodiments described below may be combined in a consistent way.

Figure 1:
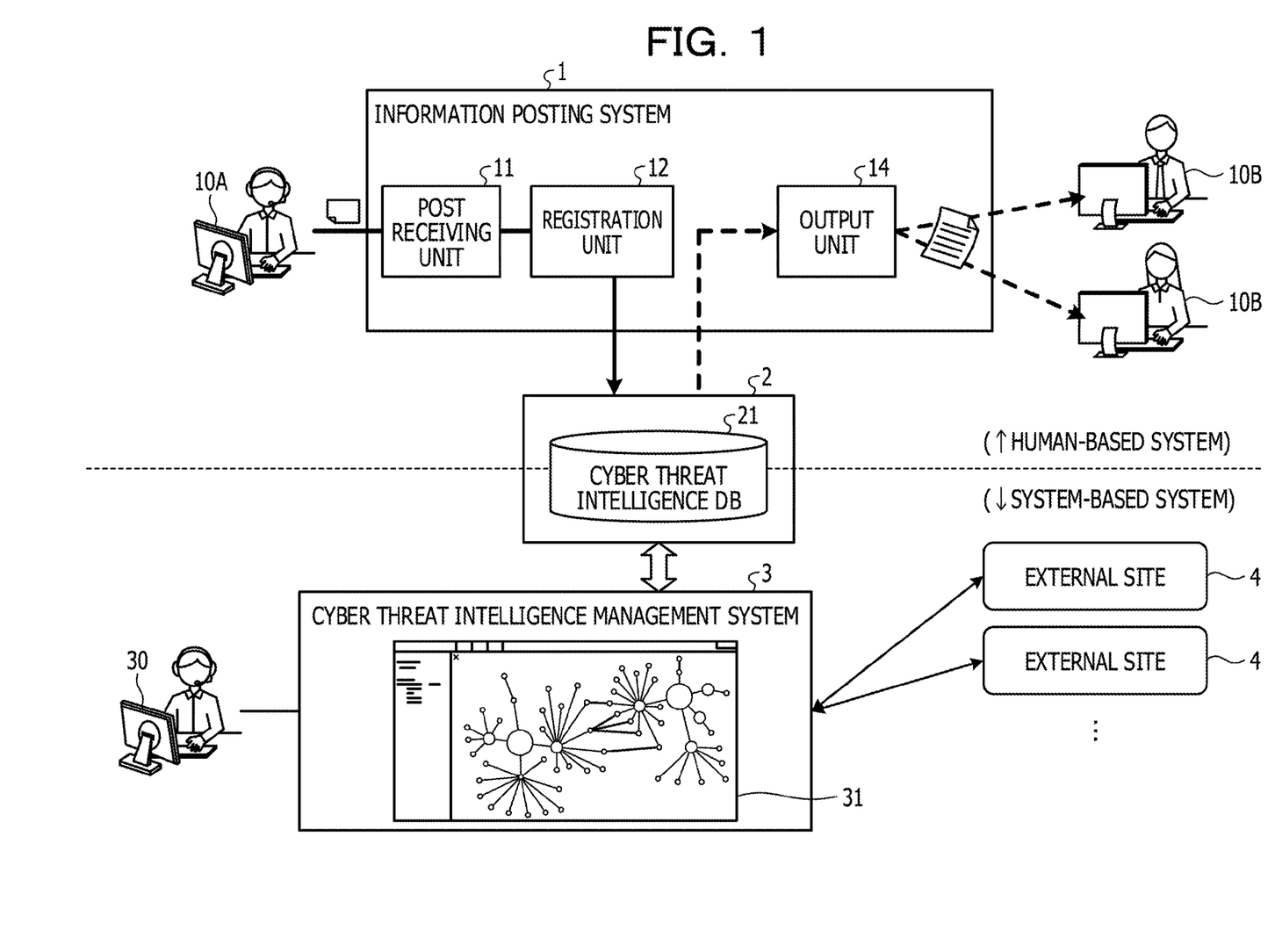
FIG. 1 illustrates a system configuration of an embodiment.

FIG. 1 illustrates a system configuration of an embodiment. Referring to FIG. 1, the system of the embodiment includes an information posting system 1, a storage device 2 storing a cyber threat intelligence DB 21, and a cyber threat intelligence management system 3.

The information posting system 1 may be an SNS, and is an example of a human-based system (first system) that delivers information posted by a user terminal 10A to another user terminal 10B. The user terminals 10A and 10B may be a personal computer (PC), a smart phone, or a tablet terminal.

The information posting system 1 includes a post receiving unit 11 that receives information posted by the user terminal 10A, a registration unit 12 that registers the posted information on the cyber threat intelligence DB 21, and an output unit 14 that outputs the information registered on the cyber threat intelligence DB 21 to the user terminal 10B.

The storage device 2 stores the cyber threat intelligence DB 21 and is connected to the information posting system 1 and the cyber threat intelligence management system 3 via a communication network (not illustrated), such as a local area network (LAN) and the Internet.

In accordance with the embodiment, the storage device 2 is separate from the cyber threat intelligence management system 3. Alternatively, the storage device 2 may be built in the cyber threat intelligence management system 3. More specifically, the cyber threat intelligence DB 21 may be mounted in the cyber threat intelligence management system 3.

The cyber threat intelligence DB 21 stores the cyber threat intelligence (CTI) on each event of cyber attack. The cyber threat intelligence stored on the cyber threat intelligence DB 21 is described in a data structure, such as a structured threat information expression (STIX) language. The STIX language is technical specifications that describe an item related to a cyber attack campaign including an event characteristic of a cyber attack. In the discussion that follows, the cyber threat intelligence has a data structure in the STIX format, but the data structure is not limited to the STIX format.

More specifically, the cyber threat intelligence includes cyber attack campaigns, and event contents of each of threat actors, and tactics, techniques, and procedures (TTPs), indicators, and observables, incidents, courses of action, and exploit targets. The event contents included together with the cyber attack campaigns may be information of some or all of the threat actors, the TTPs, the indicators, the observables, the incidents, the courses of action, and the exploit targets.

The cyber threat intelligence includes information indicating an access range indicated by a traffic light protocol (TLP). For example, the access range is indicated by RED for a receiver of the cyber threat intelligence and AMBER for a receiver and a particular person. The access range is also indicated by GREEN for within a specific community (group), and WHITE for the whole world (anybody). A person serving as an access target and a shared group are notified separately from TLP. In this way, the cyber threat intelligence management system 3 provides the cyber threat intelligence to a target indicated by the access range (such as a receiver or group).

Figure 2:
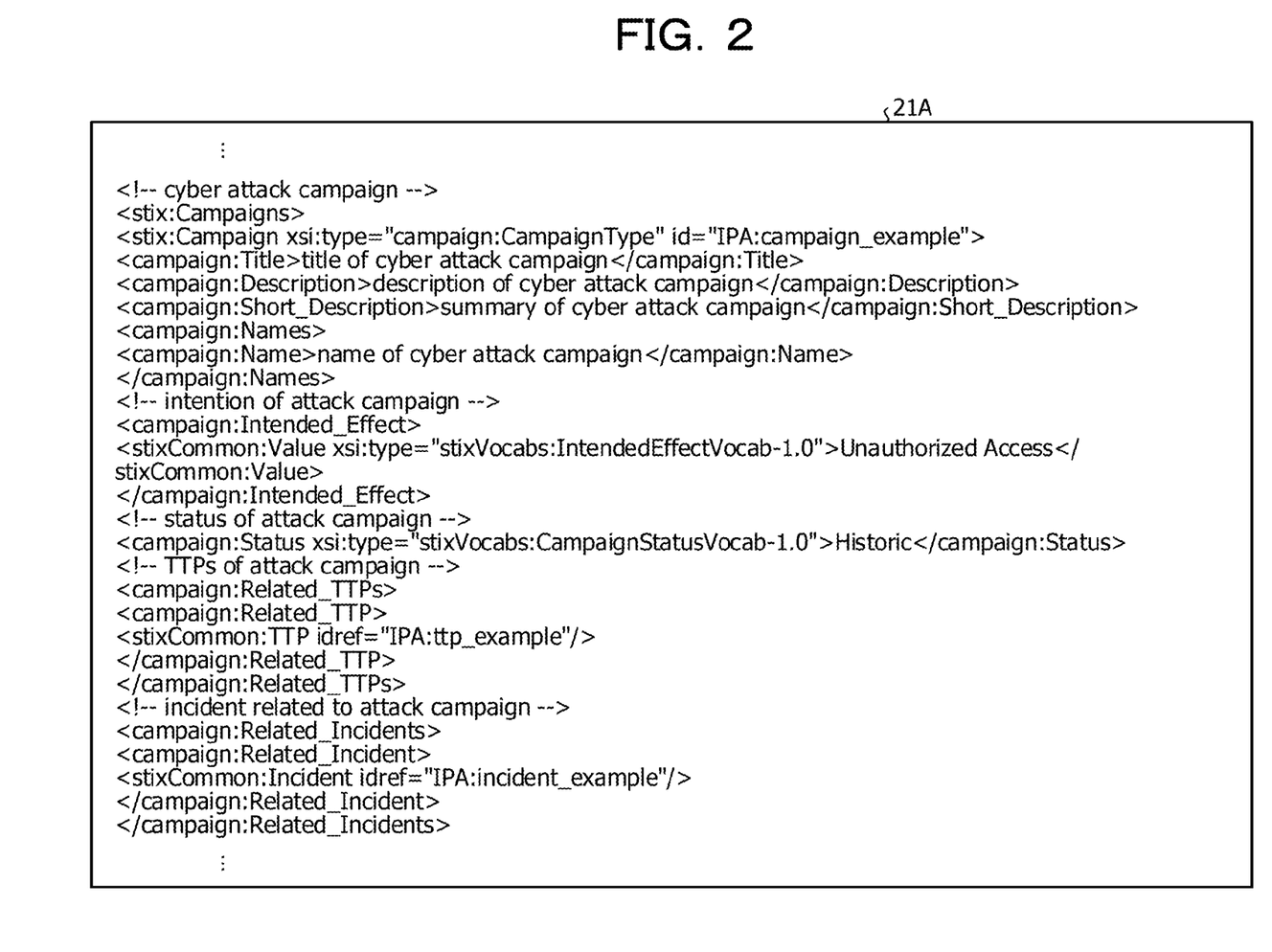
FIG. 2 illustrates an example of cyber threat intelligence.

FIG. 2 illustrates an example of the cyber threat intelligence. Referring to FIG. 2, in cyber threat intelligence 21A, tagged elements are layered (in a nested structure) using the extensible markup language (XML), and thus form the above-described information in a tree structure from a root element. More specifically, the cyber threat intelligence 21A has elements (nodes) including the cyber attack campaigns, the threat actors, the TTPs, the indicators, the observables, the incidents, the courses of action, and the exploit targets as elements (nodes), and information in each element serves as child element (child node).

The cyber threat intelligence management system 3 is an example of the system-based system (second system) that manages and uses the cyber threat intelligence 21A stored on the cyber threat intelligence DB 21 in the storage device 2.

In the United States Department of Homeland Security (DHS), the cyber threat intelligence management system 3 is connected via the Internet or the like to an external site 4, such as of automated indicator sharing (AIS) that is a mechanism sharing the cyber threat intelligence 21A or iSIGHT partners and the like that provide a delivery service of the cyber threat intelligence 21A. The cyber threat intelligence management system 3 registers on the cyber threat intelligence DB 21 the cyber threat intelligence 21A provided by the external site 4 using trusted automated exchange of indicator information (TAXII) or the like.

The cyber threat intelligence management system 3 registers on the cyber threat intelligence DB 21 the cyber threat intelligence 21A that an analyst analyzing a cyber attack has input using a user terminal 30. The cyber threat intelligence management system 3 also supplies to the external site 4 the cyber threat intelligence 21A using TAXII or the like. In the system-based system in this way, the cyber threat intelligence management system 3 and the external site 4 share the cyber threat intelligence 21A.

The cyber threat intelligence management system 3 performs syntax analysis on the cyber threat intelligence 21A stored on the cyber threat intelligence DB 21, and acquires information concerning a type of each of the cyber attack campaign, the threat actor, the TTPs, the indicator, the observable, the incident, the courses of action, and the exploit target. The cyber threat intelligence management system 3 then performs analysis, such as collecting acquired information concerning the cyber attack, and generates a display screen 31 as analysis results and causes the user terminal 30 to display the display screen 31. An analyst using the user terminal 30 may verify the analysis results of the cyber threat intelligence 21A stored on the cyber threat intelligence DB 21.

In accordance with the syntax analysis results of the cyber threat intelligence 21A, the cyber threat intelligence management system 3 sets the cyber attack campaign, the threat actor, the TTPs, the indicator, the observable, the incident, the course of action, and the exploit target in the cyber attack event to be representative nodes, and analyzes the tree structure having information in each node as child nodes. For example, the cyber threat intelligence management system 3 analyzes the tree structure by analyzing the nested structure of the tagged elements (nodes). Based on the analysis results of the tree structure, the cyber threat intelligence management system 3 then generates display information representing the display screen 31 in the form of a graph in which the nodes are linked in accordance with the tree structure. The cyber threat intelligence management system 3 then displays the display screen 31 on the user terminal 30.

The post receiving unit 11, the registration unit 12, and the output unit 14 in the information posting system 1 are described in detail.

The post receiving unit 11 receives posted information on SNS by displaying a post screen on the user terminal 10A via a communication network, such as the Internet. The post receiving unit 11 outputs the posted information received from the user terminal 10A to the registration unit 12.

The registration unit 12 attaches identification information (ID) and time information indicative of time and date of the post to the posted information received by the post receiving unit 11, and registers the resulting information on the cyber threat intelligence DB 21.

More specifically, the registration unit 12 analyzes a title, a body, and an attached file contained in the posted information, and determines whether the posted information contains information concerning a cyber attack, based on a determination as to whether a word or a phrase related to the cyber attack is contained in the title, the body, and the attached file.

If the information concerning the cyber attack is not contained, the registration unit 12 extracts the title of the posted information as an element of "STIX Header Title" in STIX. The registration unit 12 also extracts the body of the posted information as an element of "STIX Header Description" in STIX. Based on the extracted elements, the registration unit 12 generates the cyber threat intelligence 21A described in the specific data structure, such as STIX, and performs the registration operation to register the cyber threat intelligence 21A on the storage device 2. As for the attached file of the posted information, the registration unit 12 generates other cyber threat intelligence that is referenced using "Reference" from the original cyber threat intelligence 21A attached, and then registers the other cyber threat intelligence 21A on the storage device 2.

If the information concerning the cyber attack is contained, the registration unit 12 extracts, from the posted information, elements in the cyber attack event, such as the cyber attack campaign, the threat actor, the TTPs, the indicator, the observable, the incident, the courses of action, and the exploit target. Based on the extracted elements, the registration unit 12 generates the cyber threat intelligence 21A described in the specific data structure, such as STIX, and performs the registration operation to register the cyber threat intelligence 21A on the storage device 2.

Figure 3:
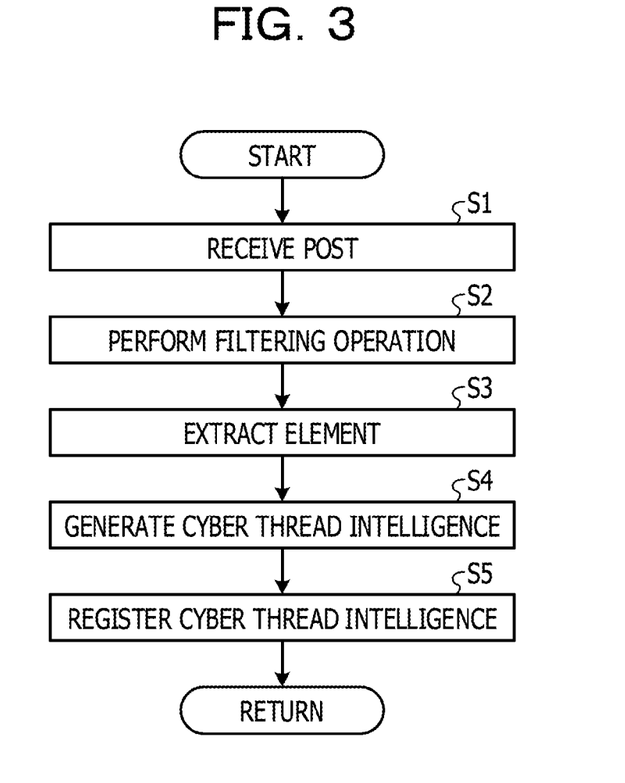
FIG. 3 is a flowchart illustrating an example of a registration process of posted information.

FIG. 3 is a flowchart illustrating an example of the registration operation of the posted information. Referring to FIG. 3, when the registration operation starts, the post receiving unit 11 receives the posted information from the user terminal 10A (S1).

Figure 4:
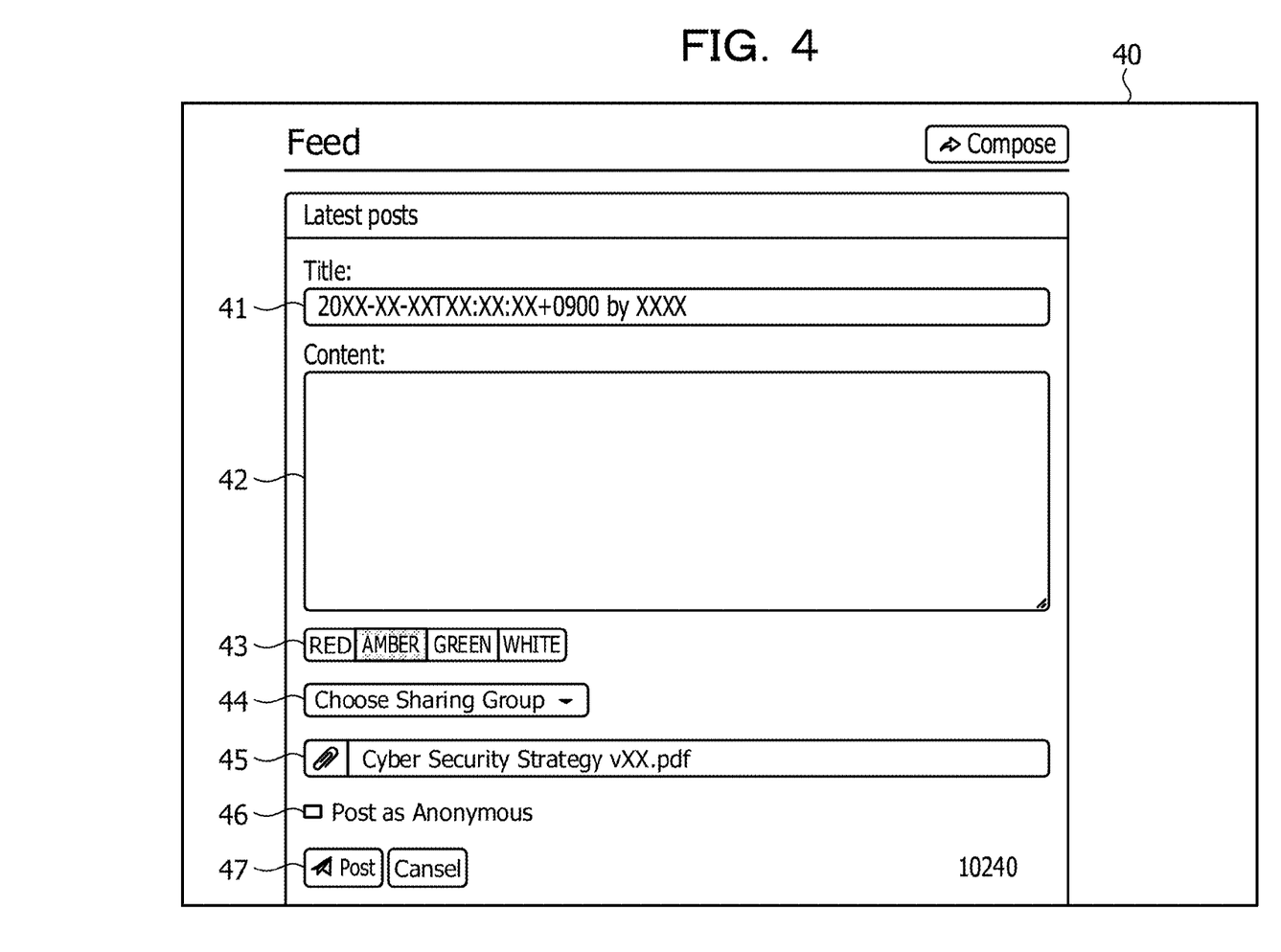
FIG. 4 illustrates an example of a post screen.

FIG. 4 illustrates an example of a post screen. Referring to FIG. 4, information is posted on a post screen 40 having input items 41 through 46, and a post button 47.

Specifically, the item 41 indicates a title of the posted information. The item 42 indicates a body of the posted information. The item 43 indicates an access range of the posted information. More specifically, the access ranges of TLP, such as RED, AMBER, GREEN, WHITE, and the like are indicated. The item 44 indicates a group or a person sharing the posted information in the access range indicated by TLP. The item 45 specifies a file that is to be attached to the posted information. In the displayed example, a single file is attached in the item 45. Multiple files may be specified in the item 45. The item 46 specifies whether the poster of the posted information is to be anonymous.

The user of the user terminal 10A sets each of the items 41 through 46, operates the post button 47, and thus transmits the posted information having the contents set in the items 41 through 46 to the information posting system 1. The registration unit 12 attaches information, such as ID and posting time, and then registers the posted information having the contents set in the items 41 through 46 on the cyber threat intelligence DB 21.

Turning back to FIG. 3, the registration unit 12 performs a filtering operation to acquire a word or a phrase related to a cyber attack in the title and the body contained the posted information (S2). Via the filtering operation, the registration unit 12 selects the posted information useful in the conversion into the cyber threat intelligence 21A.

The registration unit 12 analyzes the filtered posted information, specifically, analyzes the posted information related to the cyber attack, and extracts a variety of elements and an access range related to the cyber attack event to be used to describe the cyber threat intelligence 21A (S3).

The registration unit 12 extracts the title of the posted information as an element of "STIX Header Title" in STIX. The registration unit 12 also extracts the body of the posted information as an element of "STIX Header Description" in STIX.

The registration unit 12 extracts, from the title and the body of the posted information, elements such as a threat actor, TTPs, and an indicator, using a regular expression or natural language processing of related art, and sets the elements in STIX. The registration unit 12 also extracts a value indicated via TLP, such as RED, AMBER, GREEN, WHITE, and the like from the items of the access range in the posted information.

If a simple markup indicating an STIX element is entered in the title or the body during posting, the markup may be extracted together with the STIX element. For example, if a sentence reading "Country X is mounting a cyber attack . . . " is expressed as follows: "<Threat_Actor: Country X> is mounting a cyber attack", "Country X" is a threat actor of STIX.

The registration unit 12 extracts the STIX elements of the file attached to the posted information (a CSV file, a text file, and the like) via a regular expression or natural language processing of related art. For example, the registration unit 12 extracts an IP address, a domain name, a hash value, and the like in the indicator, based on an address list described in the CSV file. The registration unit 12 sets the extracted values as STIX indicators and STIX observables. Based on a document, such as a text file, the registration unit 12 extracts the elements, such as a threat actor, TTPs, and an indicator, and sets them to be the STIX elements. As for the attached file, the registration unit 12 may extract an STIX element, based on the markup.

The registration unit 12 generates the cyber threat intelligence 21A by tagging the elements extracted in S3 in STIX (S4), and registers the cyber threat intelligence 21A on the cyber threat intelligence DB 21 (S5). In this way, the posted information (containing information concerning the cyber attack) received by the information posting system 1 from the user terminal 10A is shared as the cyber threat intelligence 21A on the cyber threat intelligence DB 21 with the cyber threat intelligence management system 3.

Figure 5:
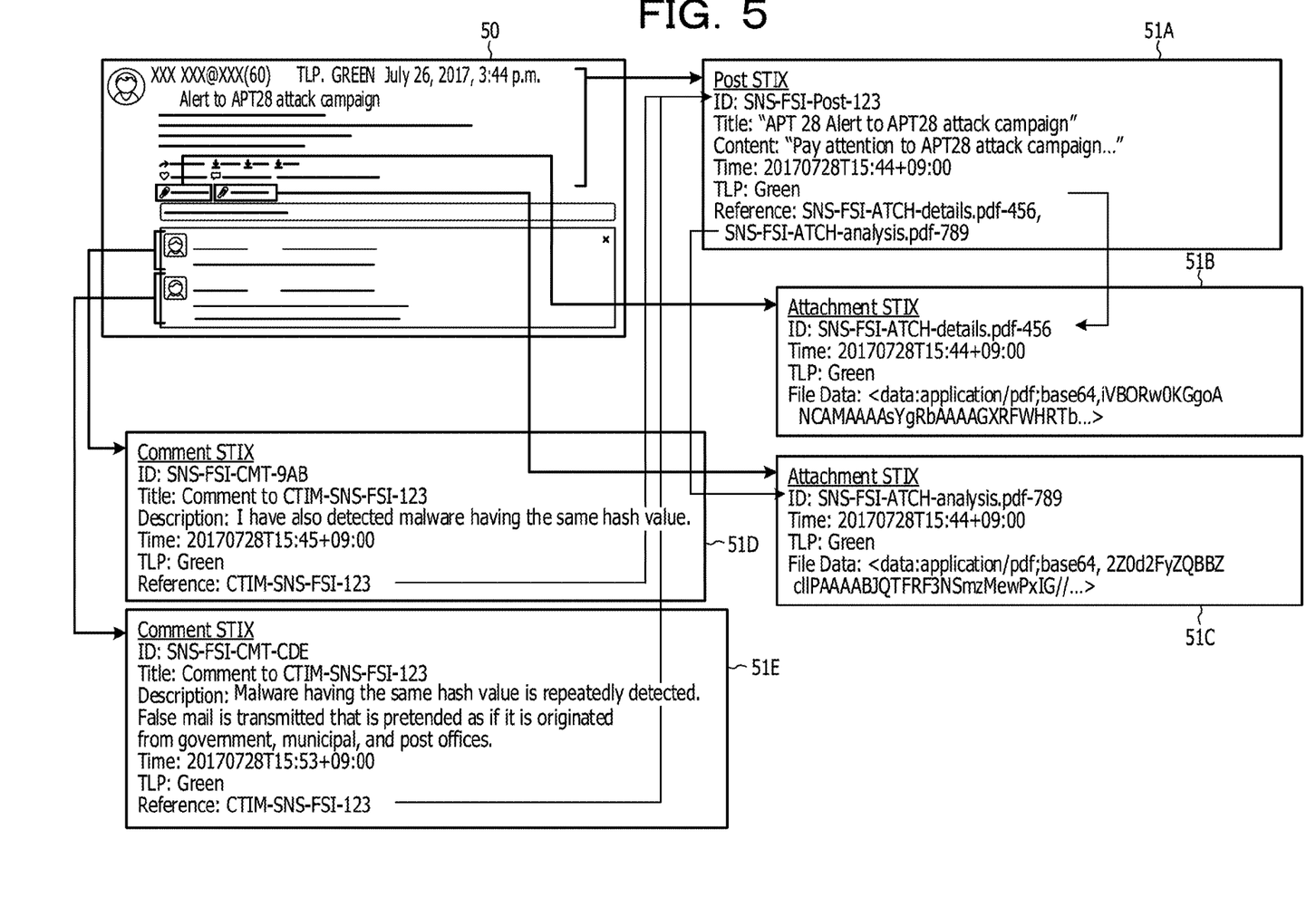
FIG. 5 illustrates a conversion operation from posted information into cyber threat intelligence.

FIG. 5 illustrates the conversion of the posted information into the cyber threat intelligence. Referring to FIG. 5, the title and the body of posted information 50 are converted into cyber threat intelligence 51A by extracting a variety of elements related to the cyber attack. Similarly, a file attached to the posted information 50 is converted into the cyber threat intelligence 51B and 51C. The attached file may be contained as an STIX element after being encoded in accordance with a specific coding method, such as Base64. Similarly, a comment related to the posted information 50 is converted into cyber threat intelligence 51D and 51E.

The conversion into the cyber threat intelligence 51A through 51E is performed with the access range specified by the posted information 50 maintained. For this reason, the access range specified by the posted information 50 remains still unchanged in the cyber threat intelligence 51A through 51E.

Each piece of the cyber threat intelligence 51A through 51E converted from the posted information 50 is tagged with respective ID, and IDs of reference destinations to be mutually referenced are described in "Reference". In this way, the reference relationship of the conversion into the cyber threat intelligence 51A through 51E is thus identified.

Turning back to FIG. 1, in response to an access from the user terminal 10B (such as a user ID identifying a user and a reference request of the posted information 50), the output unit 14 reads information registered on the cyber threat intelligence DB 21, and outputs the information to the user terminal 10B. More specifically, in response to the access from the user terminal 10B, the output unit 14 reads information falling within the access range of the posted information 50 from the cyber threat intelligence DB 21 in accordance with the user ID notified by the user terminal 10B. The output unit 14 further generates display data that indicates the posted information 50 read from the cyber threat intelligence DB 21, and outputs the display data to the user terminal 10B. In this way, the posted information 50 falling within the access range of the user of the user terminal 10B is thus displayed on the user terminal 10B.

The output unit 14 references the cyber threat intelligence DB 21 to monitor whether the cyber threat intelligence management system 3 has added new cyber threat intelligence 21A. If the new cyber threat intelligence 21A has been added on the cyber threat intelligence DB 21, the output unit 14 reads the new cyber threat intelligence 21A that has been added, and converts the new cyber threat intelligence 21A into the posted information 50, and performs an output operation to output the posted information 50 to the user terminal 10B.

Figure 6:
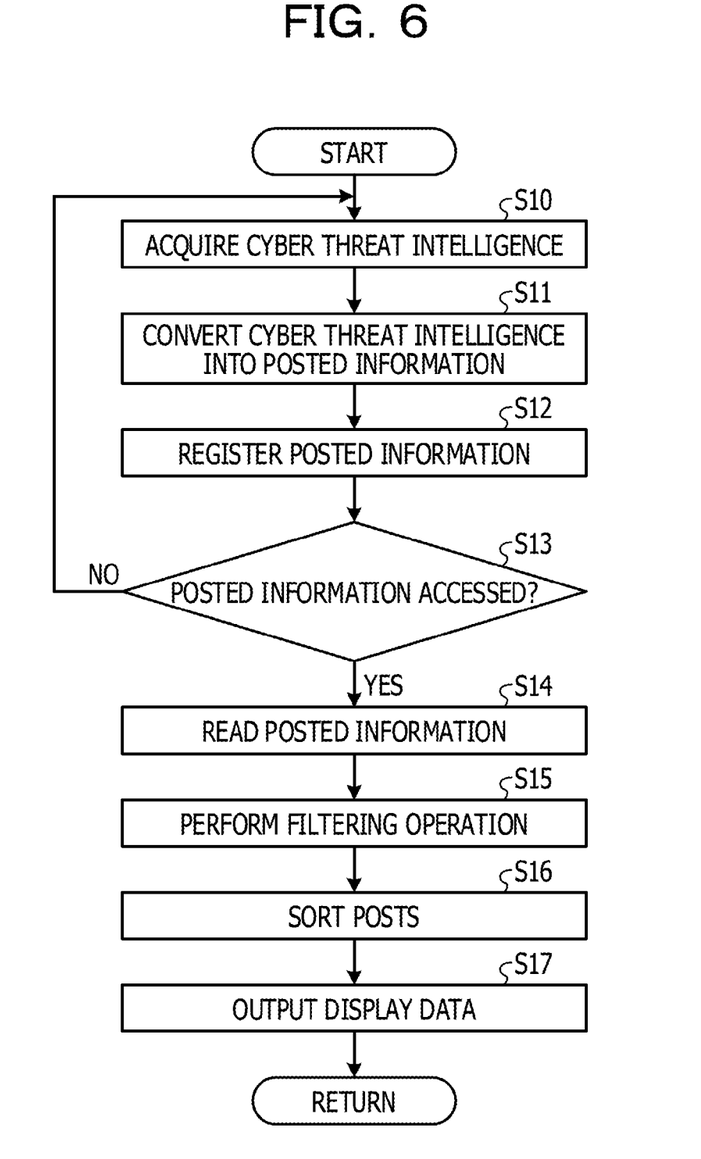
FIG. 6 is a flowchart illustrating an example of an output operation of the cyber threat intelligence.

FIG. 6 is a flowchart illustrating an example of an output operation of the cyber threat intelligence 21A. Referring to FIG. 6, when the output operation starts, the output unit 14 references the cyber threat intelligence DB 21 and determines whether the cyber threat intelligence management system 3 has added the new cyber threat intelligence 21A onto the cyber threat intelligence DB 21. If the new cyber threat intelligence 21A has been added onto the cyber threat intelligence DB 21, the output unit 14 acquires the added cyber threat intelligence 21A from the cyber threat intelligence DB 21 (S10).

The output unit 14 extracts each STIX element from the acquired cyber threat intelligence 21A, and coverts the cyber threat intelligence 21A into the posted information 50 in accordance with the extracted STIX element (S11).

More specifically, the output unit 14 converts each STIX element extracted from the cyber threat intelligence 21A into the posted information 50, based on an element easier to understand to humans. For example, "STIX Header Title" in the cyber threat intelligence 21A is converted into the title of the posted information 50. The output unit 14 also converts "STIX Header Description and/or Short Description" in the cyber threat intelligence 21A into the body of the posted information 50. The output unit 14 further converts a list of indicators and observables in the cyber threat intelligence 21A into CSV files, and allows the CSV files to be downloaded as the files to be attached to the posted information 50. The output unit 14 converts the cyber threat intelligence 21A with the access range thereof maintained into the posted information 50 as the item indicating the access range (item 43).

The output unit 14 outputs the posted information 50 converted in S11 to the user terminal 10B (S12). The cyber threat intelligence 21A newly added onto the cyber threat intelligence 21A is converted into the posted information 50 in a form that allows the user terminal 10B to gain access thereto in a way similar to the post from the user terminal 10A, and the posted information 50 is then output. The cyber threat intelligence 21A newly added onto the cyber threat intelligence DB 21 is shared with the information posting system 1.

The output unit 14 determines whether the posted information 50 has been accessed by the user terminal 10B (S13). If the posted information 50 has not been accessed by the user terminal 10B (no branch from S13), processing returns to S10.

If the posted information 50 has been accessed by the user terminal 10B (yes branch from S13), the output unit 14 reads the posted information 50 from the cyber threat intelligence DB 21 (S14). More specifically, the output unit 14 reads information within the access range of the posted information 50 from the cyber threat intelligence DB 21 in response to the user ID notified by the user terminal 10B.

The output unit 14 performs a filtering operation that selects the read posted information 50 in accordance with a predetermined condition (S15). For example, the read posted information 50 may contain, as information related to the cyber information, information useful to a user (human-based system) of the information posting system 1 and meaningless information as well. For example, the posted information 50 having a title and an indicator with no other information may be meaningful in the system-based system but not very much meaningful in the human-based system.

As an example of the filtering operation, a field of the posted information 50 matching the condition of a specific white list may pass and a field of the posted information 50 not matching the condition of the specific white list may be blocked. As another example of the filtering operation, if an Internet protocol (IP) address in a field of the posted information 50 falls within a specific range, the field may pass, and if the IP address falls outside the specific range, the field may be blocked. As yet another example of the filtering operation, if any one of the IP addresses of individual CTI in a field falls within a specific range, that CTI may pass and if all the IP addresses of the individual CTI fall outside the range, that CIP may be blocked.

Based on the specific selection condition, the output unit 14 selects the posted information 50 that is meaningful to the human-based system. If the posted information 50 having the same content is posted in a larger amount per unit time, the posted information 50 may be compressed into a single piece of representing information.

The output unit 14 sorts the filtered posted information 50 in accordance with a time sequence order indicated by posting time and date, for example, re-arranges the posted information 50 in the time sequence order of direction from latest time to past time (S16). The output unit 14 then generates display data that lists the sorted posted information 50, and outputs the display data to the user terminal 10B (S17). The user terminal 10B thus verifies the list of the posted information 50 that contains the information into which the cyber threat intelligence 21A is converted.

Figure 7:
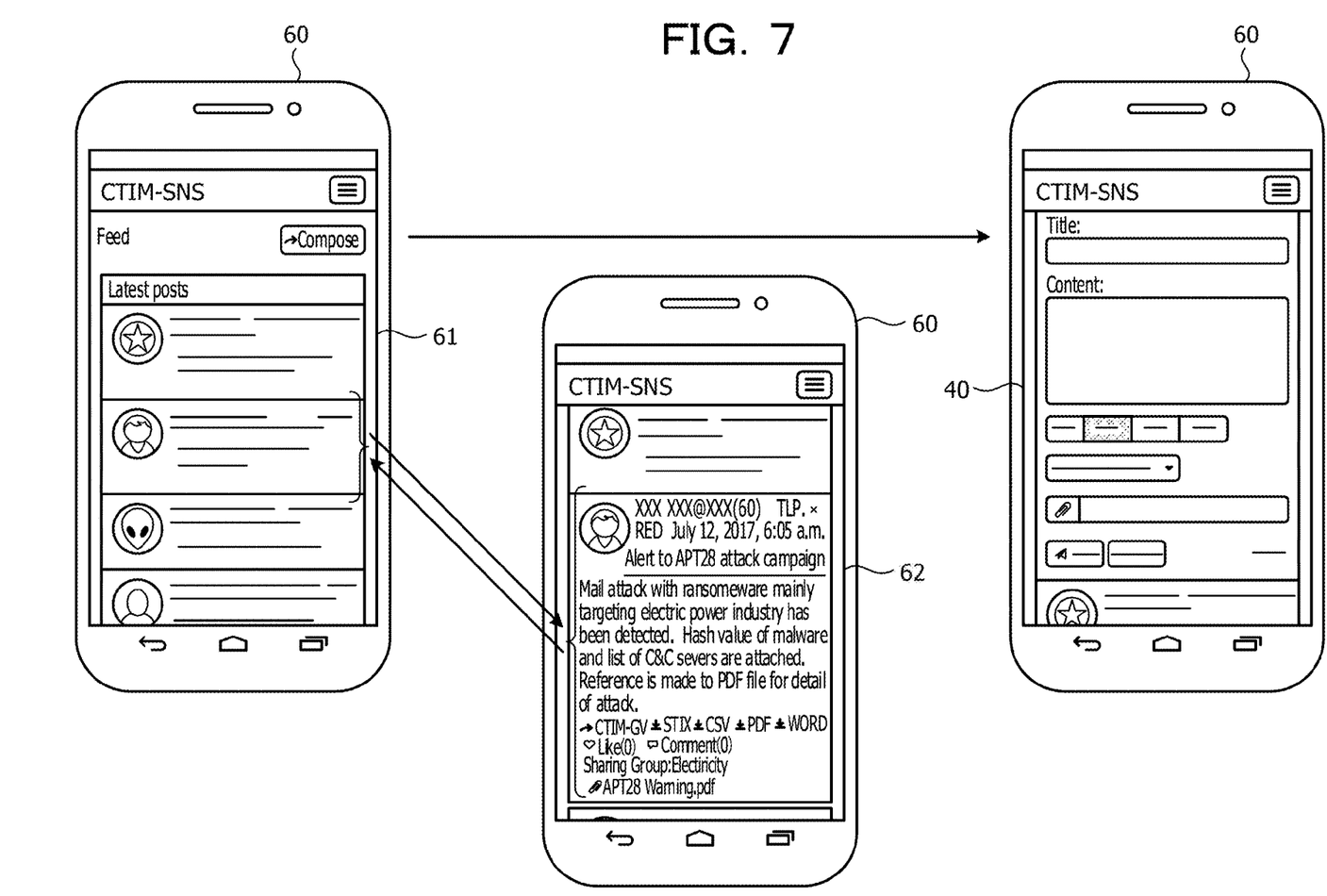
FIG. 7 illustrates a display example on a user terminal.

FIG. 7 illustrates a display example on a user terminal 60. The user terminal 60 of FIG. 7 is an example of the user terminal 10B that is of a smart phone type.

Referring to FIG. 7, the user terminal 60 displays a list display screen 61 that is based on the display data output by the output unit 14 in S17. The user of the user terminal 60 may thus verify a list of the posted information 50 that contains the information, into which the cyber threat intelligence 21A has been converted, and has been sorted in accordance with the time sequence order. The user of the user terminal 60 may post new information by performing a button operation on the list display screen 61 to call a post screen 40.

If a specific piece of the posted information 50 is selected from the list of the posted information 50 displayed on the list display screen 61, the user terminal 60 asks the output unit 14 in the information posting system 1 about the contents of the selected posted information 50. More specifically, the user terminal 60 notifies the output unit 14 in the information posting system 1 of the ID of the selected posted information 50.

Based on the ID notified by the user terminal 60, the output unit 14 references the cyber threat intelligence DB 21, and acquires information of each item in the selected posted information 50. The output unit 14 generates the display data indicating each item of the selected posted information 50, and outputs the display data to the user terminal 60. A post output screen 62 displaying each item of the selected posted information 50 is displayed on the user terminal 60.

Figure 8:
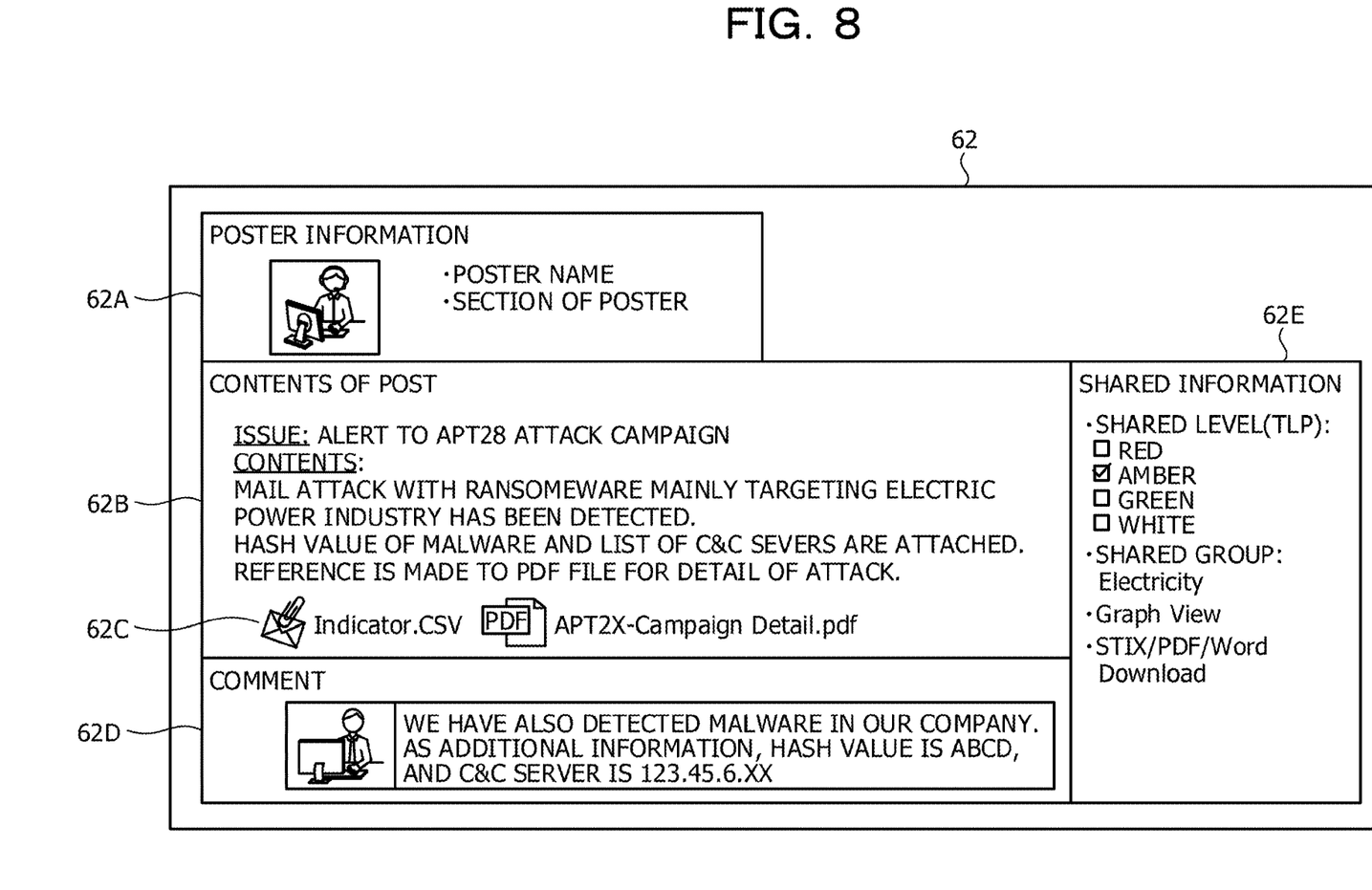
FIG. 8 illustrates an example of an output screen of the cyber threat intelligence.

FIG. 8 illustrates an example of an output screen of the cyber threat intelligence. Referring to FIG. 8, items 62A through 62E are displayed as the contents of the items of selected posted information 50 on a post output screen 62.

The item 62A displays poster information of the posted information 50. The item 62B displays post contents of the posted information 50. The item 62C displays a file attached to the posted information 50. The item 62D displays a comment related to the posted information 50. The item 62E displays shared information indicating the access range of the posted information 50. Via the post output screen 62, the user may easily recognize the detail of the posted information 50 containing the information converted from the cyber threat intelligence 21A.

Figure 9:
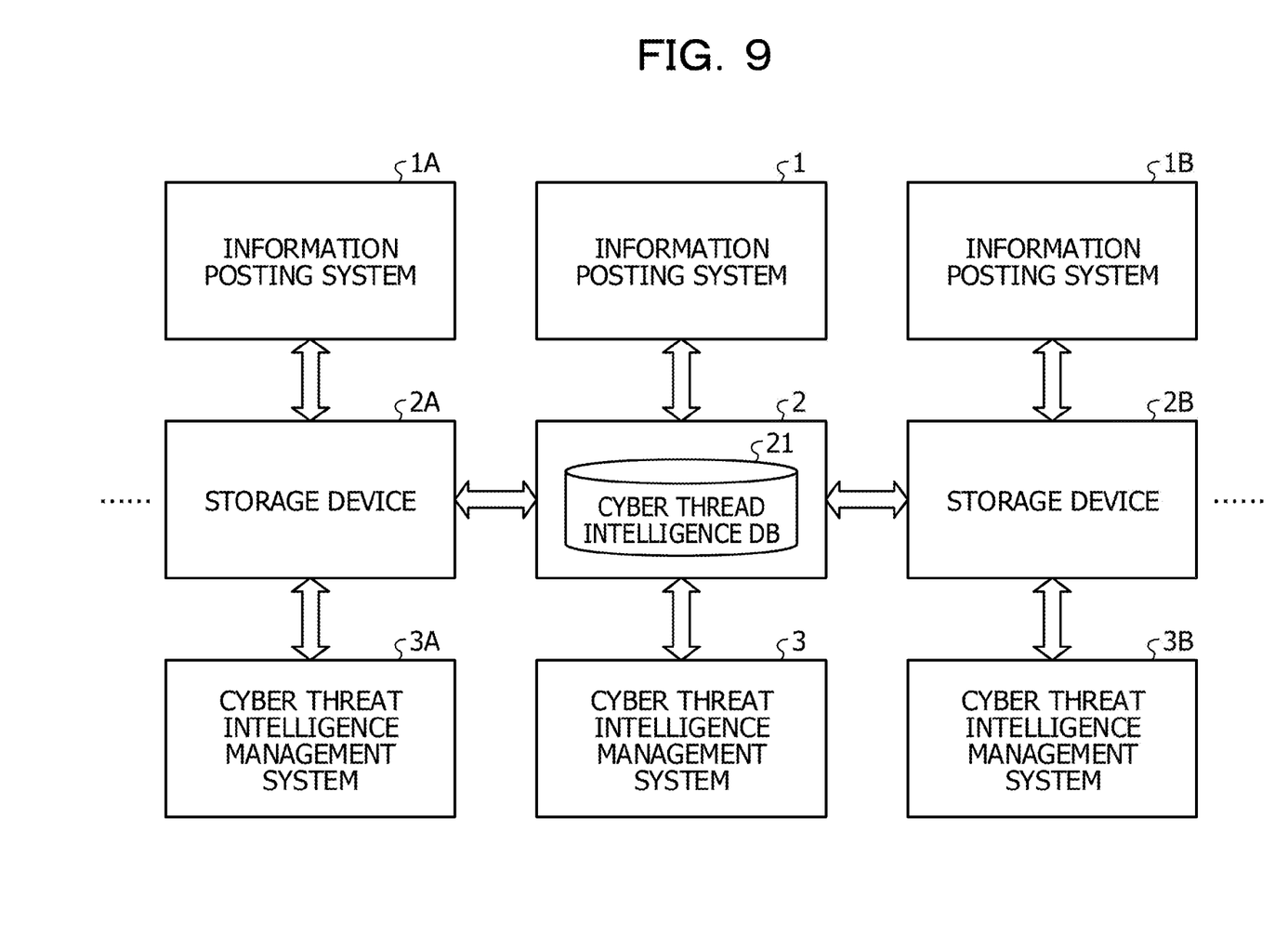
FIG. 9 illustrates an example of a distributed system configuration.

FIG. 9 illustrates an example of a distributed system configuration. Referring to FIG. 9, a security operation center (SOC) includes the information posting system 1, the storage device 2, and the cyber threat intelligence management system 3. The SOC is geographically and politically distributed, or even if the SOC is deployed in the same department, the SOC may be distributed as appropriate in view of confidentiality. In addition to the SOC that includes the information posting system 1, the storage device 2, and the cyber threat intelligence management system 3, an SOC including an information posting system 1A, a storage device 2A, and a cyber threat intelligence management system 3B, and an SOC including the information posting system 1A, a storage device 2B, and the cyber threat intelligence management system 3B are distributed (separately deployed).

From among the SOCs, information stored on the cyber threat intelligence DB 21 is transferred (shared) in accordance with a communication protocol to transfer information concerning a cyber attack, such as TAXII, between one of the storage device 2 and the cyber threat intelligence management system 3 in the central SOC and one of the storage device 2A and the cyber threat intelligence management system 3A in another SOC. In this way, the information posting system 1 of the human-based system of the SOC and the cyber threat intelligence management system 3 of the system-based system share the cyber threat intelligence 21A. Another SOC which is geographically or politically distributed, and separately deployed in view of confidentiality may share the cyber threat intelligence 21A.

When the registration unit 12 in the information posting system 1 receives information concerning a cyber attack from the user terminal 10A, the registration unit 12 stores the received information on the cyber threat intelligence DB 21, and registers (stores) the received information in a state that allows the user terminal 10B to gain access the received information via the output unit 14. The registration unit 12 converts the data structure of the information concerning the cyber attack into the cyber threat intelligence 21A in a state usable in the cyber threat intelligence management system 3 (for example, in the STIX format), and then registers (stores) the cyber threat intelligence 21A on the storage device 2 or the cyber threat intelligence management system 3. If another piece of posted information (such as new cyber threat intelligence 21A) related to the cyber attack is added onto the cyber threat intelligence DB 21, the output unit 14 in the information posting system 1 converts the other piece of posted information added in a form that allows the user terminal 10B to gain access to the information, and then outputs the converted information to the user terminal 10B.

The information concerning the cyber attack received by the information posting system 1 from the user terminal 10A is shared with the cyber threat intelligence management system 3 as the cyber threat intelligence 21A stored on the cyber threat intelligence DB 21. The cyber threat intelligence 21A that is newly added onto the cyber threat intelligence DB 21 via the cyber threat intelligence management system 3 or the external site 4 is output to the user terminal 10B in a way similar to the posting from the user terminal 10A, and is thus shared with the information posting system 1. In this way, the cyber threat intelligence 21A is shared by the information posting system 1 as the human-based system and the cyber threat intelligence management system 3 as the system-based system.

Both the posted information 50 and the cyber threat intelligence 21A contain information defining the access range. In the conversion from the posted information 50 to the cyber threat intelligence 21A and in the conversion from the cyber threat intelligence 21A to the posted information 50, the access range is maintained. In each of the information posting system 1 and the cyber threat intelligence management system 3, the same access range is maintained.

When the posted information 50 containing changed cyber threat intelligence 21A is transmitted to the user terminal 10B, the information posting system 1 displays the posted information 50 in the time sequence order stored. In this way, the user of the user terminal 10B may more easily recognize the time sequence order of the posted information 50 containing the cyber threat intelligence 21A that has been changed.

The elements of each of the apparatuses described above may not necessarily have to be physically constructed exactly as illustrated. Actual configurations of the distribution and integration of the apparatuses are not limited to the configuration illustrated, and some or all of the configurations may be distributed or integrated according to any functionality unit or any physical unit depending on a variety of workloads and usage status.

Some or all of the processes and functionalities performed by the information posting system 1 and the cyber threat intelligence management system 3 may be performed on a CPU (or a microprocessor unit (MPU), or a micro controller unit (MCU)). Some or all of the processes and functionalities may be performed on a program that is executed for analysis by the CPU (or a microcomputer, such as MPU or MCU) or wired-logic hardware. The processes and functionalities may be performed by cloud computing in which multiple computers operate in concert with each other.

Figure 10:
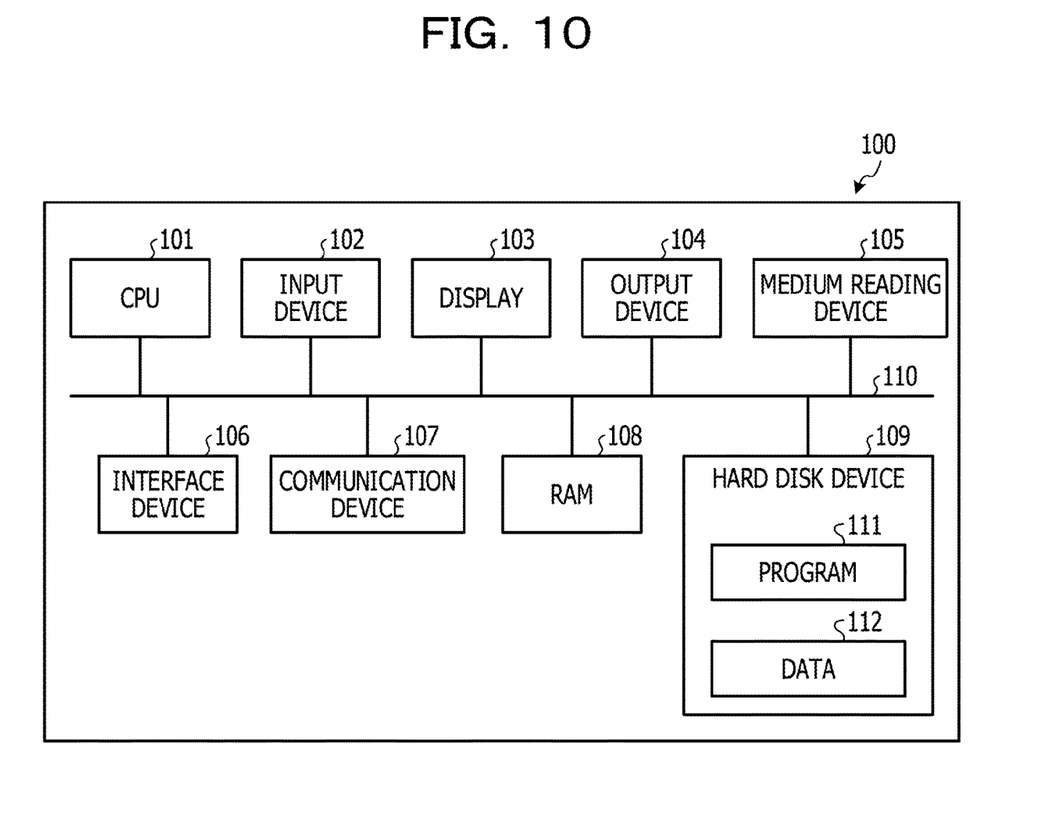
FIG. 10 is a block diagram illustrating a hardware configuration of an information processing apparatus of the embodiment.

The processes described with reference to the embodiment may be implemented by causing a computer to execute a program prepared in advance. An example of a computer (hardware) that executes the program having the same functionalities as those of the above-described embodiment is described below. FIG. 10 is a block diagram illustrating a hardware configuration of an information processing apparatus 100 of the embodiment.

Referring to FIG. 10, the information processing apparatus 100 includes a CPU 101 performing a variety of arithmetic operations, an input device 102 receiving input data, a display 103, and an output device 104 outputting a sound. The information processing apparatus 100 further includes a medium reading device 105 that reads a program and the like from a storage medium, an interface device 106 that connects to a variety of devices, and a communication device 107 that is wiredly or wirelessly connected to an external device for communication. The information processing apparatus 100 further includes a random-access memory (RAM) 108 that temporarily stores a variety of information, and a hard disk device 109. The elements (the CPU 101 through the hard disk device 109) in the information processing apparatus 100 are interconnected via a bus 110.

The hard disk device 109 stores a program 111 that performs a variety of functionalities of the post receiving unit 11, the registration unit 12, the output unit 14, and the like. The hard disk device 109 stores a variety of data 112 (such as the cyber threat intelligence DB 21) to be referenced by the program 111. The input device 102 receives operation information from a user of the information processing apparatus 100. The display 103 displays a variety of screens to be operated by the user. The interface device 106 is connected to a printer or the like. The communication device 107 is connected a communication network, such as the Internet, and exchanges a variety of information with an external device via the communication network.

The CPU 101 reads the program 111 from the hard disk device 109, and expands the program 111 onto the RAM 108, thereby performing a variety of operations related to the registration unit 12 and the output unit 14. The program 111 may not necessarily be stored on the hard disk device 109. For example, the information posting system 1 may read the program 111 from a readable storage medium, and may execute the program 111. The storage media that are readable by the information processing apparatus 100 may include a portable recording medium, such as a compact disk read-only memory (CD-ROM), a digital versatile disk (DVD), or a universal serial bus (USB), a semiconductor memory, such as a flash memory, and a hard disk drive. The program 111 may be stored on a device connected to a public telephone network, the Internet, or a local-area network (LAN), and the information processing apparatus 100 may read the program 111 from the device and execute the program 111.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A cyber attack information processing apparatus comprising:
   a memory configured to store a cyber threat intelligence database (DB) and connected to a first system and a second system; and
   a processor coupled to the memory, the processor being configured to:
   in response to an event that the first system obtains first information regarding a cyber attack from a first terminal, store the first information in a state that the first information is accessible to a second terminal that is capable of accessing the first system, the first information including post contents posted by a user of the first terminal, the post contents included in the first information having a text message represented in a natural language;
   convert the first information having a first data structure into second information having a second data structure usable by the second system wherein the second information is to be provided for the second system;
   in response to an event that the second system obtains third information regarding another cyber attack, convert the third information having the second data structure into fourth information having the first data structure by generating a text message represented in the natural language using information elements extracted from the third information, the fourth information having the generated text message represented in the natural language; and
   provide the second terminal with the fourth information,
   wherein the first system is an information posting system for a social networking service (SNS) delivering a message posted by a user using a user terminal to another user through another user terminal, and the second system is a cyber threat intelligence management system,
   wherein the second information and the fourth information are to be transmitted to the memory in accordance with a specific communication protocol that is used to transmit information regarding a cyber attack.

2. The cyber attack information processing apparatus according to claim 1, wherein the second data structure is in a structure threat information expression.

3. The cyber attack information processing apparatus according to claim 1, wherein a range of the first information where access is permitted is equal to a range of the second information.

4. The cyber attack information processing apparatus according to claim 1, wherein the fourth information is provided for the second terminal in accordance with a time order in which the third information is obtained by the second system.

5. The cyber attack information processing apparatus according to claim 1, wherein fifth information regarding a cyber attack stored in the memory is to be transmitted to a second storage available by the first system in accordance with the specific communication protocol, the fifth information having the second data structure.

6. A computer-implemented cyber attack information processing method comprising:
   in response to an event that a first system obtains first information regarding a cyber attack from a first terminal, storing the first information in a state that the first information is accessible to a second terminal that is capable of accessing the first system, the first information including post contents posted by a user of the first terminal, the post contents included in the first information having a text message represented in a natural language;
   converting the first information having a first data structure into second information having a second data structure usable by a second system wherein the second information is to be provided for the second system;
   in response to an event that the second system obtains third information regarding another cyber attack, converting the third information having the second data structure into fourth information having the first data structure by generating a text message represented in the natural language using information elements extracted from the third information, the fourth information having the generated text message represented in the natural language; and
   providing the second terminal with the fourth information,
   wherein the first system is an information posting system for a social networking service (SNS) delivering a message posted by a user using a user terminal to another user through another user terminal, and the second system is a cyber threat intelligence management system,
   wherein the second information and the fourth information are to be transmitted to a storage device in accordance with a specific communication protocol that is used to transmit information regarding a cyber attack, the storage device storing a cyber threat intelligence database (DB) and connected to the first system and the second system.

7. The cyber attack information processing method according to claim 6, wherein the second data structure is in a structure threat information expression.

8. The cyber attack information processing method according to claim 6, wherein a range of the first information where access is permitted is equal to a range of the second information.

9. The cyber attack information processing method according to claim 6, wherein the fourth information is provided for the second terminal in accordance with a time order in which the third information is obtained by the second system.

10. The cyber attack information processing method according to claim 9, wherein fifth information regarding a cyber attack stored in the storage device is to be transmitted to a second storage available by the first system in accordance with the specific communication protocol, the fifth information having the second data structure.

11. A non-transitory computer-readable medium storing a cyber attack information processing program that causes a computer to execute a process comprising:

in response to an event that a first system obtains first information regarding a cyber attack from a first terminal, storing the first information in a state that the first information is accessible to a second terminal that is capable of accessing the first system, the first information including post contents posted by a user of the first terminal, the post contents included in the first information having a text message represented in a natural language;

converting the first information having a first data structure into second information having a second data structure usable by a second system wherein the second information is to be provided for the second system;

in response to an event that the second system obtains third information regarding another cyber attack, converting the third information having the second data structure into fourth information having the first data structure by generating a text message represented in the natural language using information elements extracted from the third information, the fourth information having the generated text message represented in the natural language; and providing the second terminal with the fourth information, wherein the first system is an information posting system for a social networking service (SNS) delivering a message posted by a user using a user terminal to another user through another user terminal, and the second system is a cyber threat intelligence management system, wherein the second information and the fourth information are to be transmitted to a storage device in accordance with a specific communication protocol that is used to transmit information regarding a cyber attack, the storage device storing a cyber threat intelligence database (DB) and connected to the first system and the second system.

12. The medium according to claim 11, wherein the second data structure is in a structure threat information expression.

13. The medium according to claim 11, wherein a range of the first information where access is permitted is equal to a range of the second information.

14. The medium according to claim 11, wherein the fourth information is provided for the second terminal in accordance with a time order in which the third information is obtained by the second system.

15. The medium according to claim 11, wherein fifth information regarding a cyber attack stored in the storage device is to be transmitted to a second storage available by the first system in accordance with the specific communication protocol, the fifth information having the second data structure.

* * * * *